(12) United States Patent
Abbiati

(10) Patent No.: US 8,660,398 B2
(45) Date of Patent: Feb. 25, 2014

(54) OPTICAL TRANSITION BOX

(75) Inventor: Fabio Abbiati, Milan (IT)

(73) Assignee: Prysmian S.p.A., Milan (IT)

( * ) Notice: Subject to any disclaimer, the term of this patent is extended or adjusted under 35 U.S.C. 154(b) by 152 days.

(21) Appl. No.: 13/299,955

(22) Filed: Nov. 18, 2011

(65) Prior Publication Data

US 2012/0128310 A1 May 24, 2012

(30) Foreign Application Priority Data

Nov. 19, 2010 (IT) .................................. MI10A2145

(51) Int. Cl.
*G02B 6/00* (2006.01)
(52) U.S. Cl.
USPC ........................................................ 385/135
(58) Field of Classification Search
None
See application file for complete search history.

(56) References Cited

U.S. PATENT DOCUMENTS

| 5,764,843 | A  | 6/1998 | Macken et al.   |
| 5,790,741 | A  | 8/1998 | Vincent et al.  |
| 2009/0060445 | A1 | 3/2009 | Mullaney et al. |
| 2010/0142909 | A1 | 6/2010 | Mullaney et al. |
| 2010/0232752 | A1 | 9/2010 | Labraymi et al. |
| 2011/0194830 | A1 | 8/2011 | Mullaney et al. |

FOREIGN PATENT DOCUMENTS

| EP | 2141528 A1   | 1/2010 |
| WO | 2009/029258 A1 | 3/2009 |

OTHER PUBLICATIONS

Italian Search Report in counterpart Italian Application No. MI20102145 dated Oct. 11, 2011, pp. 1-2.

*Primary Examiner* — Jerry Rahll
(74) *Attorney, Agent, or Firm* — Addition, Higgins, Pendleton & Ashe, P.A.

(57) ABSTRACT

The present invention embraces an optical transition box for housing the connection between a riser cable and a drop cable of an optical access network. The box has a base, which itself typically includes: a bottom for housing the excess lengths of the optical fibers of the riser cable and of the drop cable, a first sidewall and a splice-holder element for housing the splices between the optical fibers. Typically, the splice-holder element is fixed to the first sidewall and overhangs above the bottom. A distance not less than the diameter of an optical fiber is typically provided between the bottom and the splice-holder element.

20 Claims, 5 Drawing Sheets

OPTICAL TRANSITION BOX

CROSS-REFERENCE TO PRIORITY APPLICATION

This U.S. application hereby claims the benefit of pending Italian Application No. MI2010A 002145 (filed Nov. 19, 2010), which is hereby incorporated by reference in its entirety.

FIELD OF THE INVENTION

The present invention relates to the field of apparatuses for the installation of optical access networks. In particular, the present invention relates to an optical transition box for housing an optical connection between a riser cable and at least one drop cable of an optical access network.

BACKGROUND

An optical network known as FTTP ("Fiber To The Premises") or FTTH ("Fiber To The Home") is an optical access network that supplies broadband or ultra-broadband communication services to a number of end users (e.g., services that require data transmission speeds measuring several hundred Mbit/s or even higher).

An optical FTTP or FTTH network typically includes a distribution box, which is typically located in the basement or vault of the building in which the end users reside. As used herein, a "riser cable" is an optical-fiber cable that typically leads out of the distribution box and runs in a vertical direction in the interior of the building from the basement or vault to each floor. Between two successive floors, the riser cable is typically laid in a duct, which mechanically protects the cable. This duct can be fixed to the surface of a wall or can be housed within the wall itself (e.g., in concrete). For example, the riser cable can run within this duct together with other cables, such as cables for distributing power and telephone cables.

At each floor of the building, the optical, electric, and telephone cables typically pass through junction boxes or cases so as to be connected to the equipment in the apartments or offices of the end users. A junction box typically has a minimum surface area of about 10 centimeters×10 centimeters.

The riser cable can be connected optically to one or more drop cables. As used herein, a "drop cable" is an optical-fiber cable that typically runs towards an apartment or office of an end user within a special duct fixed to the surface of the wall or housed within the thickness thereof. To connect the riser cable to the drop cables, a number of optical fibers are pulled out of the riser cable and are spliced to respective ends of the optical fibers of the drop cables. Each drop cable is then typically terminated in a termination box located in the proximity of or inside an apartment or office of an end user.

U.S. Patent Publication No. 2010/0232752, which is hereby incorporated by reference in its entirety, describes a branching device for a riser cable. A window is cut in the casing of the riser cable at a branching point thereof so as to expose the fibers enclosed therein. The branching device is positioned at the branching point and includes a housing for the riser cable and six outlet ports. The outlet ports branch off from the housing in an oblique direction. The outlet ports are suitable for conducting six fibers pulled out of the riser cable to the outside of the device such that they can be spliced to respective optical fibers of drop cables. Each splice is housed in a telescopic protection device, which is connected to the respective outlet port of the branching device. This telescopic protection device can be lengthened so as to house the excess length of the spliced fibers. The splice and the excess length housed in the telescopic protection device can be located in the duct in which the drop cable is laid. The telescopic protection device is made of flexible material and therefore can be rolled up within the duct, if required.

European Patent Publication No. 2,141,528, which is hereby incorporated by reference in its entirety, describes a modular distribution box that is suitable for receiving a riser cable and for distributing the fibers of the riser cable to a user. The box includes two stackable layers and a cover. The lower layer is substantially flat and has an inlet port and two outlet ports to allow the riser cable to pass through the box. The lower layer also has a routing element, which is suitable for routing the fibers pulled out of the riser cable from the lower layer to the upper layer. The upper layer includes reception channels that are suitable for receiving the fibers of the riser cable from the lower layer. Any splices between the fibers of the riser cable and the fibers of the drop cables are housed in the upper layer. The fibers leaving the splices are routed towards an outlet port of the upper layer.

The optical connection between a riser cable and one or more drop cables on a floor of the building can be housed in a junction box already installed on that floor. The branching device of U.S. Patent Publication No. 2010/0232752 can be used in this respect but has a number of disadvantages. First, because the splices between the fibers of the riser cable and the fibers of the drop cables—protected by the telescopic protection device—are housed within the duct that carries the drop cable, the telescopic protection device can become wedged within the duct. In addition, because the telescopic protection device is rather bulky, it is often possible to house only a single splice within each duct. Moreover, it is difficult to carry out maintenance on the riser cable or on the drop cable. What is more, maintenance has to be carried out gently on other cables present in the duct.

In contrast, the distribution box described by European Patent Publication No. 2,141,528 would allow both the splices and the excess length of the optical fibers to be housed in its interior. In particular, the dimensions and structure of the box are such as to allow about ten meters of optical fiber to be housed therein. However, this length of fibers is not necessary in FTTP or FTTH applications, and thus the distribution box of European Patent Publication No. 2,141,528 is needlessly complex and bulky. In addition, it is too bulky to be inserted inside a junction box.

Therefore, a need exists for an improved distribution box.

SUMMARY

It is an object of the present invention to provide an optical transition box for housing an optical connection between a riser cable and at least one drop cable of an optical access network. This optical transition box, which can be easily installed inside a junction box, allows one or more splices of the optical connection and the possible excess length of the spliced optical fibers—necessary for possible work and maintenance—to be housed in its interior.

According to typical embodiments of the present invention, this object can be achieved by an optical transition box having a base suitable for receiving a portion of a riser cable and the ends of one or more drop cables. The base includes a bottom suitable for housing the excess length of the optical fibers, which are pulled out of the riser cable and the drop cables. The base also includes a splice-holder element suitable for housing the splices between the fibers of the riser cable and the fibers of the drop cable(s). This splice-holder element overhangs from a sidewall of the base above the bottom at a certain distance therefrom.

This element makes it possible to house a section of the riser cable, the splices, and the excess lengths of the optical fibers within a compact single body. Indeed, whereas the splices are housed in the splice-holder element, the excess lengths of the optical fibers can be housed on the bottom of the base, extending in part below the splice-holder element and in part above the section of riser cable housed in the base.

In the following text of the present description and of the claims, the expression "optical fiber" is used to indicate an optical fiber or an optical module includes an optical fiber and a sheath. The riser cable and the drop cables can include one or more optical modules housed in the outer casing of the cable.

In one aspect, the present invention embraces an optical transition box for housing an optical connection between a riser cable and at least one drop cable of an optical access network. The optical transition box includes a base, which typically includes: (i) a bottom configured to house excess lengths of at least one first optical fiber of the riser cable and of at least one second optical fiber of the drop cable; (ii) a first sidewall; and (iii) a splice-holder element fixed to the first sidewall and overhanging from the first sidewall above the bottom, the splice-holder element being suitable for housing at least one splice between the first optical fiber and the second optical fiber, wherein a distance not less than a diameter of the first optical fiber is provided between the bottom and the splice-holder element.

It is preferable that the splice-holder element includes at least one shelf projecting in a cantilevered manner towards the interior of the base from the first sidewall, the shelf including one or more slots configured to house the at least one splice.

It is preferable that the bottom includes a slit configured for being engaged by a portion of the riser cable so that the portion is accessible from the interior of the base.

It is preferable that the bottom includes at least one ramp located in the proximity of the slit, the ramp being configured to raise the excess lengths above the portion of the riser cable.

According to a particularly advantageous embodiment, the bottom includes at least one stop element that crosses the slit, the stop element being configured so that, when the portion of the riser cable engages the slit, the portion of the riser cable lies against the stop element.

It is preferable that the base includes at least a second sidewall adjacent to the first sidewall such that the first sidewall forms with the second sidewall a channel suitable for housing the drop cable to allow the drop cable to exit the base.

It is preferable that the first sidewall has first teeth and the second sidewall has second teeth substantially facing the first teeth, the first teeth and the second teeth being suitable for retaining the drop cable in the channel.

According to an advantageous embodiment, the base includes one or more retaining tabs, which have a height with respect to the bottom greater than the height of the first sidewall.

It is advantageous that the base has a width of between about 30 millimeters and 60 millimeters, a height of between about 55 millimeters and 85 millimeters, and a thickness of between about 10 millimeters and 30 millimeters.

It is preferable that the base is a single body made of a plastic material.

The foregoing illustrative summary, as well as other exemplary objectives and/or advantages of the invention, and the manner in which the same are accomplished, are further explained within the following detailed description and its accompanying drawings.

DETAILED DESCRIPTION

FIGS. 1-4 show an optical transition box 1 (referred to herein as "box") according to a preferred embodiment of the present invention. The figures are not to scale.

The box 1 includes a base 2. It also conveniently includes a cover 3.

Figure 2:
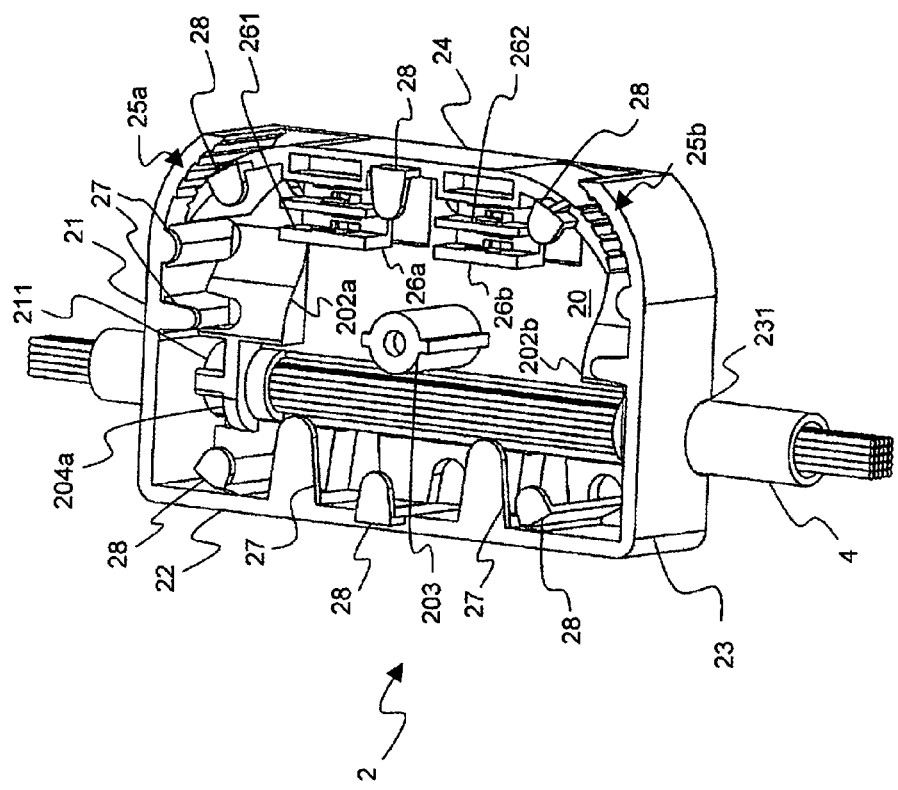
FIG. 2 is an axonometric view of the base of the optical transition box shown in FIG. 1.
Figure 3:
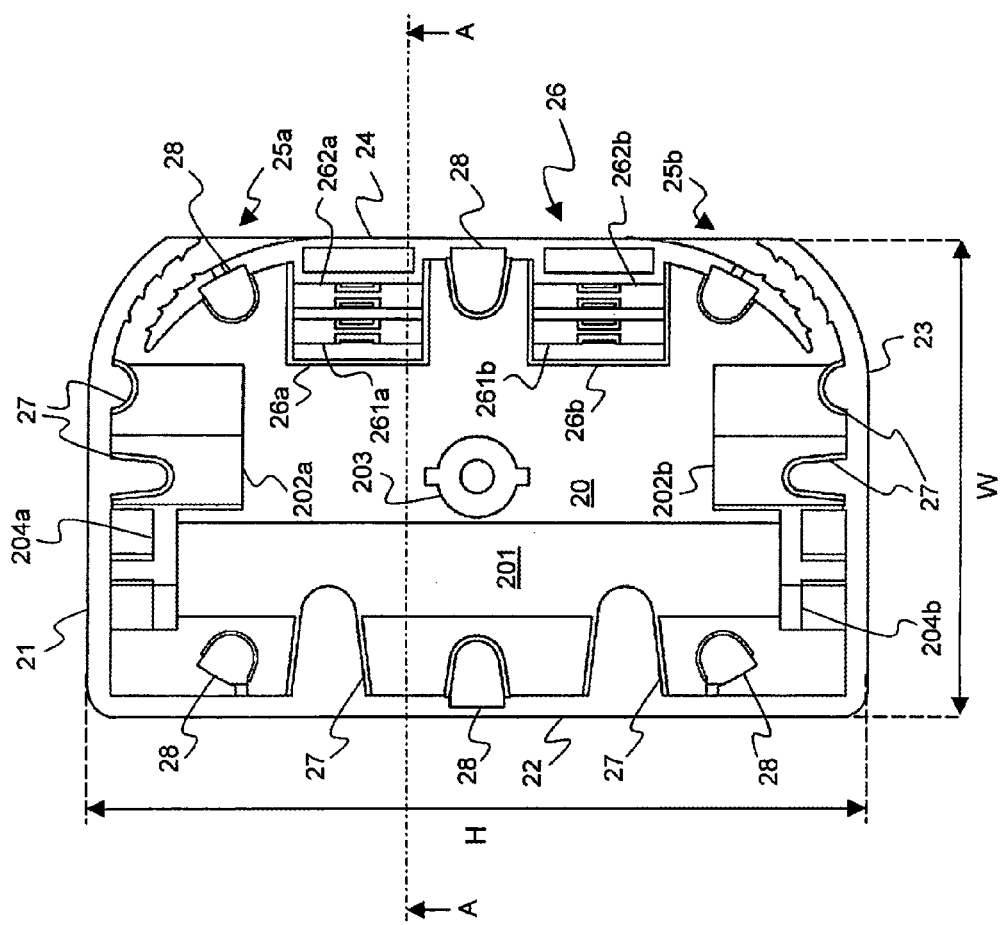
FIG. 3 is a plan view of the base shown in FIG. 2.
Figure 4:
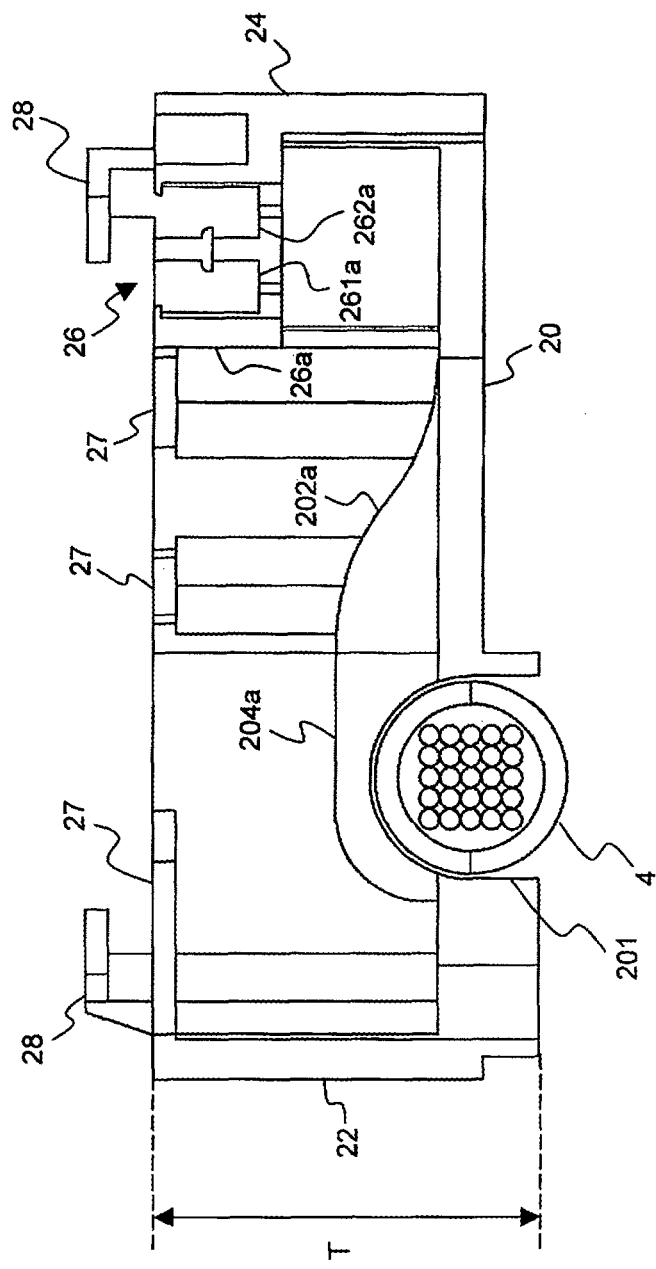
FIG. 4 is a sectional side view of the base shown in FIG. 2 according to the section plane A-A shown in FIG. 3.

With reference to FIGS. 2, 3, and 4, the base 2 includes a bottom 20 and adjacent sidewalls 21, 22, 23, and 24. The sidewalls 21, 22, 23, and 24 are preferably substantially perpendicular to the bottom 20 (e.g., perpendicularly abutting). The bottom 20 is preferably substantially rectangular with two adjacent, rounded-off corners.

Along the edge opposite the two adjacent, rounded-off corners, the bottom 20 typically includes a slit 201 which crosses the entire bottom 20. The slit 201 can be located at the edge of the bottom 20, or parallel thereto and at a certain distance therefrom.

In one embodiment, the bottom 20 includes two ramps 202a, 202b. The ramps 202a, 202b are preferably located in the proximity of the opposing ends of the slit 201 and are substantially perpendicular thereto. Each ramp 202a, 202b has a height which is greatest towards the slit 201 and which reduces as the distance therefrom increases. The ramps 202a, 202b typically have a curved or linear profile. The ramps 202a, 202b are configured so as to make it easier to house excess lengths of optical fibers within the box 1, as will be explained in greater detail below.

The bottom 20 also includes two stop elements 204a, 204b. Each stop element 204a, 204b can include a curved bridge which crosses the slit 201. The stop elements 204a, 204b are preferably located at the ends of the slit 201. In particular, each of the stop elements 204a, 204b is located adjacent to one of the ramps 202a, 202b. It is preferable for each stop element 204a, 204b to be connected to one of the ramps 202a, 202b at the greatest height thereof. With preference, the height of the stop elements 204a, 204b with respect to the bottom 20 is not greater than the maximum height of the ramps 202a, 202b. The stop elements 204a, 204b act as stops to block a section of the riser cable housed in the slit 201, as will be explained in greater detail below.

In the embodiment illustrated in FIG. 2, the bottom 20 of the base also includes a fixing element 203. The fixing element 203 typically includes a hollow cylinder, which extends towards the interior of the base 2 from the bottom 20 in a direction substantially perpendicular thereto. The cavity of the fixing element 203 is configured to receive an appropriate fixing member (e.g., a threaded member such as a screw or a pin) for fixing the cover 3 to the base 2, as will be described in greater detail below. To this end, the surface of the cavity of the fixing element 203 can have a thread.

In the embodiment illustrated, the sidewall 24 located opposite the edge of the bottom 20 along which the slit 201 runs is bent at its ends. In particular, the profile of the ends of the sidewall 24 forms a concavity towards the interior of the base 2. The profile has a radius of curvature which is typically greater than or equal to a minimum radius of curvature, which depends on the type of optical fiber to be housed in the base 2. By way of example, optical fibers defined by the ITU-T G.657.A1 (November 2009) recommendations typically have a minimum radius of curvature of 20 millimeters.

Each of the two sidewalls 21 and 23 adjacent to the sidewall 24 and perpendicular thereto has its end next to the bent sidewall 24. The bent ends of the two sidewalls 21 and 23 also have a profile with a radius of curvature which is typically greater than or equal to the minimum radius of curvature.

The bent ends of the sidewalls 21 and 23 at least partially flank the bent ends of the wall 24 to the outside thereof, so as to form two channels 25a, 25b. Each channel 25a, 25b typically has a width which is substantially equal to the outer diameter of the drop cable chosen for the application. Indeed, the channels 25a, 25b allow for the ends of several drop cables to be housed stacked one on top of another, as will be explained in greater detail below. The inner surface of the bent end of the walls 21, 23 and the outer surface of the bent ends of the wall 24 typically have teeth, which make it possible for the drop cables to be fixed securely in the channels 25a, 25b.

Each of the sidewalls 21 and 23 also includes a recess 211, 231 substantially aligned with the slit 201. The recesses 211, 231 preferably have a semicircular shape. The slit 201 and the recesses 211, 231 are configured to house a portion of a riser cable, as will be described in greater detail below.

The base 2 typically includes a splice-holder element 26. The splice-holder element 26 typically includes one or more shelves. The box 1 shown in FIGS. 2, 3, and 4 includes, for example, two shelves 26a, 26b. The shelves 26a, 26b project from the inner surface of the sidewall 24 at a distance from the bottom 20 that is typically not less than the diameter of an optical fiber, so that sufficient space remains under said shelves to position at least one coil of optical fibers, as will be described below.

Each shelf 26a, 26b typically includes one or more slots parallel to the sidewall 24. In the embodiment shown in FIG. 2-3, each shelf 26a, 26b includes a pair of parallel slots 261a-262a, 261b-262b. The slots 261a, 262a of the first shelf 26a are typically aligned with the slots 261b, 262b of the second shelf 26b, respectively, so that the slots 261a and 261b of the first shelf 26a form a first splice-holder housing and the slots 262a and 262b of the second shelf 26b form a second splice-holder housing. In alternative embodiments, which are not shown in the figures, it is possible for three or more pairs of slots to be present. The cantilevered arrangement of the shelves 26a, 26b advantageously makes it possible to house both the excess length of the optical fibers and the splices in the box 1 and, at the same time, to minimize the dimensions of the box 1, as will be discussed in detail below.

The base 2 typically includes a number of first retaining tabs 27 and a number of second retaining tabs 28. In particular, the first retaining tabs 27 typically project towards the interior of the base 2 from the free edge of the sidewalls 21, 22, and 23 in a direction substantially parallel to the bottom 20. The second retaining tabs 28 typically extend above the free edge of the sidewalls 21, 22, 23, and 24 at a certain distance therefrom, and also project towards the interior of the base 2 in a direction substantially parallel to the bottom 20. In the embodiment shown in FIG. 2-3, the base 2 includes three second retaining tabs 28 arranged substantially between the sidewall 22 and the slit 201 so as to define a first section of a curved guide path, and three second retaining tabs 28 arranged along the sidewall 24 opposite so as to define a second section of the curved guide path. The first retaining tabs 27 and the second retaining tabs 28 are configured to retain one or more optical fibers within the base 2, as will be explained below.

The base 2 preferably has a width W of between about 30 millimeters and 60 millimeters. More preferably, the width W is between about 35 millimeters and 50 millimeters. Even more preferably, the width W is equal to about 44 millimeters.

The base 2 preferably has a height H of between about 55 millimeters and 85 millimeters. More preferably, the height H is between about 60 millimeters and 80 millimeters. Even more preferably, the height H is equal to about 71 millimeters.

It is preferable that the base 2 has a thickness T that makes it possible for a number of drop cables equal to the number of splices which can be housed in the splice-holder element 26 to be stacked in each channel 25a, 25b. The thickness T of the base 2 is preferably between about 10 millimeters and 30 millimeters. More preferably, the thickness T is between about 15 millimeters and 25 millimeters. Even more preferably, the thickness T is equal to about 19 millimeters.

The base 2 of the transition box 1 can be advantageously realized as a single body by molding a plastic material. For example, the plastic material used can be ABS (acrylonitrile butadiene styrene).

Figure 1:
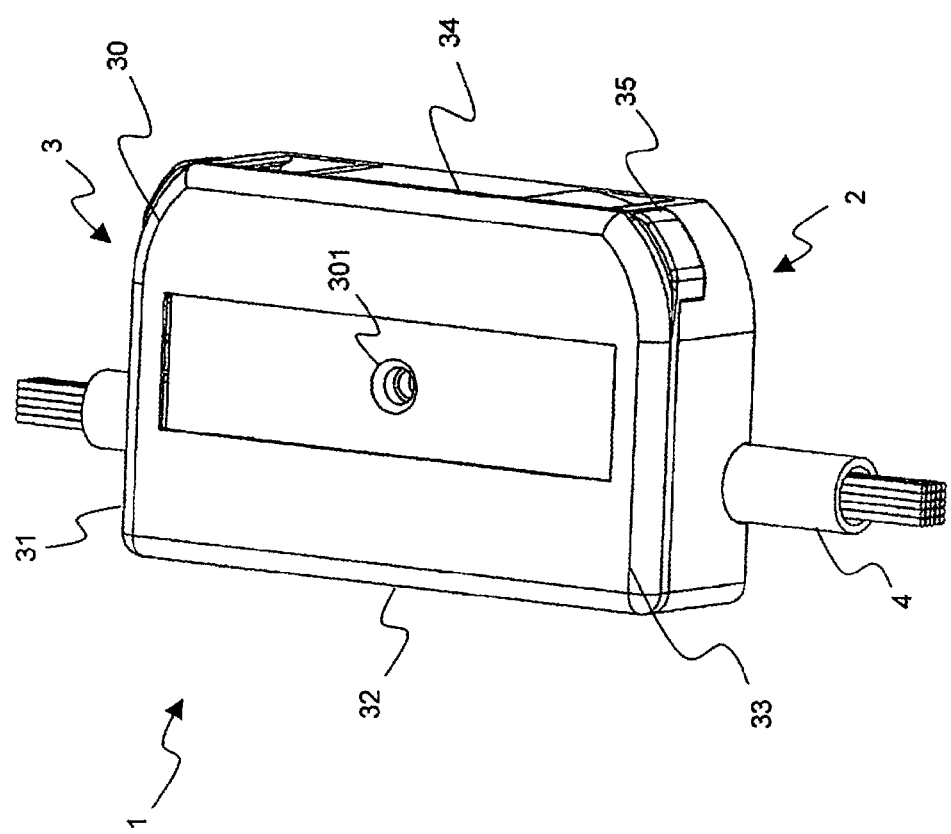
FIG. 1 is an axonometric view of an optical transition box according to a preferred embodiment of the present invention.

With reference to FIG. 1, the cover 3 includes a top 30 and four sidewalls 31, 32, 33 and 34. The shape and dimensions of the cover 3 correspond to the shape and dimensions of the base 2, and therefore the cover 3 can be placed on the base 2 to close the box 1.

According to the embodiment shown in FIG. 1, the cover 3 has two rounded-off corners. In addition, the cover 3 typically includes two teeth 35 placed in the proximity of the two rounded-off corners. Typically, the teeth 35 project from the sidewalls of the cover 3 such that, when the cover 3 is placed on the base 2, they rest against the bent ends of the sidewalls 21, 23. The teeth 35 make it easier to correctly position the cover 3 on the base 2 and prevent the cover 3 from being able to move with respect to the base 2 as it is being fixed thereto.

The top 30 of the cover 3 preferably includes a fixing hole 301. When the cover 3 is placed on the base 2, the fixing hole 301 is aligned with the cavity of the fixing element 203 of the base 2.

The cover 3 can advantageously be realized using the same material and the same process as for the base 2.

Below, an exemplary process for installing the transition box 1 will be described in detail.

Figure 5:
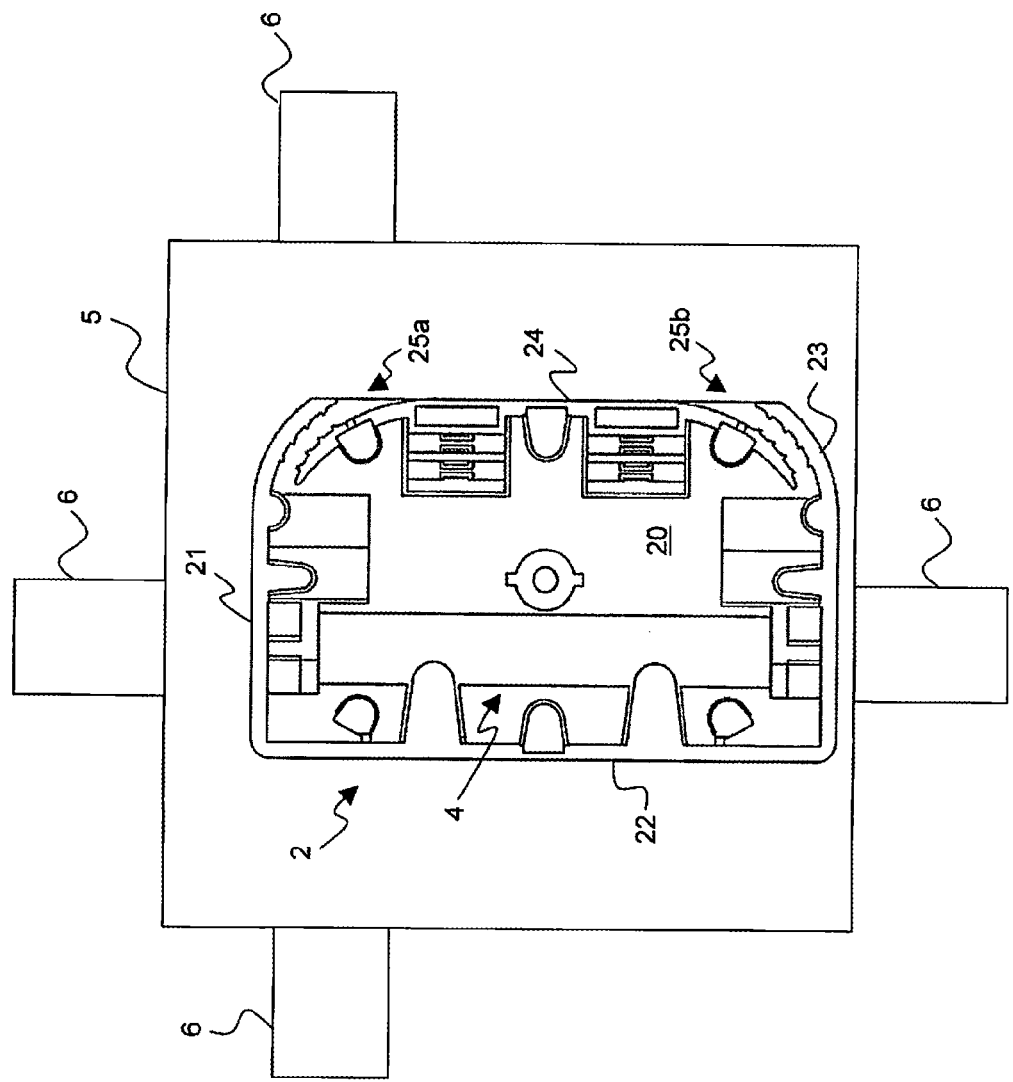
FIG. 5 is a view from the front of a junction box, the interior of which houses the base of the box shown in FIG. 1.

A transition box 1 is typically installed on one floor of a building for optically connecting a riser cable 4, which runs vertically between the floors of the building, to one or more drop cables (not shown in the figures), which preferably run towards the apartments or offices of end users residing on that floor. Typically, a portion of the riser cable 4 is housed within a junction box 5 (as shown in FIG. 5) preinstalled on the floor of the building, for example fixed to a wall. Various ducts 6, in which electric cables, telephone cables and/or optical cables (in particular the riser cable 4 and one or more drop cables) can be housed, are connected to the junction box 5.

The riser cable 4 includes a number of optical fibers, which can be arranged in the outer casing of the cable in any known arrangement. For example, the optical fibers can be arranged in strips, modules, and/or micromodules, which in turn are housed in the outer casing. Typically, each optical fiber of the riser cable is arranged in a respective optical module, which includes one or more optical fibers and a sheath.

Each drop cable can include one or more optical fibers. Typically, each drop cable includes a single optical fiber arranged in an optical module, which includes the optical fiber and a sheath.

Below, for reasons of simplicity, the expression "optical fiber" (relating both to the fibers of the riser cable and to the fibers of the drop cable) indicates an optical fiber with the respective sheath.

Typically, before installing the box 1 in the interior of the junction box 5 containing the riser cable 4, an operator opens an access window in the casing of the portion of the riser cable 4 housed in the junction box 5, so as to expose the optical fibers present therein.

Then, the operator places the base 2 of the box 1 on the riser cable 4, such that the section of riser cable 4 at which the access window was cut is housed in the slit 201 and engages the recesses 211, 231 of the sidewalls 21, 23.

Then, the operator fixes the riser cable 4 to the base 2. To this end, the operator typically passes two fastening members (e.g., two ties) around the riser cable 4, on the outside of the two stop elements 204a, 204b. The operator then closes each fastening member within the base 2, securely joining together the two ends thereof. Each fastening member thus remains blocked between a respective stop member 204a, 204b and a respective sidewall 21, 23, such that the riser cable 4 cannot run in an axial direction with respect to the base 2.

The fastening members are preferably two plastic cable ties, which, as is known, are knurled and, at one end thereof, have a fixing head with an opening suitable for receiving the opposite end of the tie. The knurling prevents the end from slipping out of the opening.

When the cable ties are wrapped around the cable 4 and tightened around the latter as described above, the fixing heads thereof rest against the stop elements 204a, 204b and firmly retain the portion of riser cable 4 in the slit 201. The heads of the ties are rotated towards the shaped corners of the sidewalls 21, 22 and 23, 22 such that they do not obstruct the positioning of the optical fibers.

Once the riser cable 4 has been fixed to the base 2, the operator pulls one or more optical fibers (referred to below as "riser fibers") out of the cable 4. In particular, the number of riser fibers that the operator can pull out of the cable 4 can be equal to the number of splices that can be housed in the splice-holder element 26. The operator pulls the riser fibers out of the cable 4 to a length sufficient to make the splices (e.g., several tens of centimeters).

In addition, the operator exposes the respective optical fibers from one or more drop cables (referred to below as "drop fibers") which are to be spliced to the riser fibers. For example, the operator can expose two drop fibers to be spliced to two of the four riser fibers pulled out of the cable 4. The drop fibers are exposed to a length sufficient to make the splices with the riser fibers (e.g., several tens of centimeters). Then, the operator splices two of the riser fibers pulled out of the cable 4 to the two drop fibers pulled out.

Then, the operator houses the splices in the splice-holder element 26, collects the excess length of the riser fibers and of the drop fibers in one or more coils with a perimeter smaller than the perimeter of the bottom 20, and lays the excess length of the spliced riser fibers and drop fibers on the bottom 20.

For example, the two splices can be housed each in a respective splice-holder housing (i.e., one splice can be housed in the slots 261a, 261b of the first shelf 26a and the other splice can be housed in the slots 262a, 262b of the second shelf 26b). As an alternative, the two splices can be stacked in the same splice-holder housing (e.g., formed by the slots 261a, 261b of the first shelf 26a).

On the other hand, the excess length of the spliced fibers is laid out on the surface of the bottom 20 along the perimeter thereof. In particular, the excess length is positioned under the splice-holder element 26 along the wall 24, on the ramps 202a, 202b along the sidewalls 21 and 23 and above the riser cable 4 along the sidewall 22. In other words, the excess length of the spliced fibers lies on an inclined plane with respect to the bottom 20. The excess length of the spliced fibers is held in position by the first retaining tabs 27.

The cantilevered splice-holder element 26 therefore advantageously makes it possible to improve the use of the space in the interior of the base 2. Indeed, the excess length of the riser fibers and of the drop fibers can advantageously be housed exploiting the entire perimeter of the bottom 20, passing under the splice-holder element 26. In other words, the splice-holder element 26 typically does not take up any space on the bottom 20, and this space can therefore be used entirely to house the excess length of the fibers. In addition, the ramps 202a, 202b advantageously make it possible to also utilize the portion of the bottom 20 occupied by the riser cable 4, raising the excess length of the fibers thereabove.

In order to be led out of the base 2, the drop cables including the spliced drop fibers are therefore typically housed in one of the channels 25a, 25b of the base 2, depending on the reciprocal position of the box 1 and of the outlet of the duct from which the drop fibers emerge. In particular, the spliced drop cables are typically stacked one on top of another in one of the channels 25a, 25b. The teeth of the sidewalls 24 and 21, 23 at the channels 25a, 25b advantageously securely retain the casing of the drop cables.

Then, the operator can also lay the excess length of the two non-spliced riser fibers pulled out of the riser cable 4 in the base 2. To this end, the excess length of these non-spliced riser fibers can also be collected in one or more coils, which are then typically laid in the base 2 along the perimeter thereof, above the excess length of the spliced fibers. In particular, the coils of the non-spliced fibers can be positioned below the splice-holder element 26 along the wall 24, on the ramps 202a, 202b along the sidewalls 21 and 23 and above the first retaining tabs 27 along the sidewall 22. Along the sidewall 22, the coils of the non-spliced fibers are typically held in position by the second retaining tabs 28.

As an alternative, the coils of the non-spliced fibers can be housed around the perimeter of the base 2 between the first retaining tabs 27 and the second retaining tabs 28. In this second case, the coils are held in position by the second retaining tabs 28 along the entire perimeter thereof.

The excess lengths of the non-spliced riser fibers are therefore advantageously separated from the excess lengths of the spliced fibers, inasmuch as they lie above them and are separated therefrom by the tabs 27. If the operator subsequently has to splice these fibers too, the positioning thereof above the spliced fibers makes it possible to easily reach their free ends without having to touch the already spliced fibers.

Lastly, the box 1 can be closed by placing the cover 3 on the base 2, such that the fixing hole 301 of the cover 3 is aligned with the cavity of the fixing element 203. The cover 3 can then be fixed to the base 2, such as with a threaded member (e.g., a screw or a bolt).

Advantageously, a transition box in accordance with the present invention typically enables the interior thereof to house a section of the riser cable, one or more splices of an optical connection between the riser cable and one or more drop cables, and the excess lengths of the optical fibers pulled out of these cables, in a greatly reduced space. The riser cable, the splices, and the excess lengths of the fibers are advantageously housed in the interior of the base of the box in a single body, but on two levels. The box is therefore very compact and also very simple, because it does not contain any complex parts such as rotatable splice-holder trays or guide elements of complicated shapes in which the fibers are laid.

The box therefore provides the mechanical protection needed both for the excess lengths of the fibers and for the splices. The small dimensions of the box and the fact that the drop cables leave this box in a direction tangential to the box mean that it is possible to house the box in the interior of a junction box on each floor of a pre-cabled building.

It is also easy to install this box, because it can be placed on the exposed portion of the riser cable without the bottom of the base of the box having to pass behind the cable.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical transition box (1) for housing an optical connection between a riser cable (4) and at least one drop cable of an optical access network, said optical transition box (1) comprising a base (2) comprising:
   a bottom (20) configured to house excess lengths of a first optical fiber of a riser cable (4) and of a second optical fiber of a drop cable;
   a first sidewall (24) positioned adjacent to said bottom (20);
   at least a second sidewall (21, 23) adjacent to said first sidewall (24), wherein said first sidewall (24) forms with said second sidewall (21, 23) a channel (25a, 25b) suitable for housing the drop cable and for allowing the drop cable to exit said base (2); and
   a splice-holder element (26) fixed to said first sidewall (24) and overhanging from said first sidewall (24) above said bottom (20), said splice-holder element (26) being suitable for housing at least one splice between the first optical fiber of the riser cable (4) and the second optical fiber of the drop cable, wherein a distance not less than the diameter of the first optical fiber of the riser cable (4) is provided between said bottom (20) and said splice-holder element (26).

2. The optical transition box (1) according to claim 1, wherein said first sidewall (24) has first teeth and said second sidewall (21, 23) has second teeth substantially facing said first teeth, said first teeth and said second teeth being suitable for retaining the drop cable in said channel (25a, 25b).

3. An optical transition box (1) for housing an optical connection between a riser cable (4) and at least one drop cable of an optical access network, said optical transition box (1) comprising a base (2) comprising:
   a bottom (20) configured to house excess lengths of a first optical fiber of a riser cable (4) and of a second optical fiber of a drop cable, wherein said bottom (20) comprises a slit (201) configured for being engaged by a portion of the riser cable (4) so that the portion of the riser cable is accessible from the interior of said base (2);
   a first sidewall (24) positioned adjacent to said bottom (20); and
   a splice-holder element (26) fixed to said first sidewall (24) and overhanging from said first sidewall (24) above said bottom (20), said splice-holder element (26) being suitable for housing at least one splice between the first optical fiber of the riser cable (4) and the second optical fiber of the drop cable, wherein a distance not less than the diameter of the first optical fiber of the riser cable (4) is provided between said bottom (20) and said splice-holder element (26).

4. The optical transition box (1) according to claim 3, wherein said bottom (20) comprises at least one stop element (204a, 204b) that crosses said slit (201), said stop element (204a, 204b) being configured so that, when the portion of the riser cable (4) engages said slit (201), the portion of the riser cable (2) lies against said stop element (204a, 204b).

5. The optical transition box (1) according to claim 3, wherein said splice-holder element (26) comprises at least one shelf (26a, 26b) projecting towards the interior of said base (2) from said first sidewall (24), said at least one shelf (26a, 26b) comprising one or more slots (261a, 262a, 261b, 262b) configured to house at least one splice.

6. The optical transition box (1) according to claim 5, wherein said bottom (20) comprises at least one stop element (204a, 204b) that crosses said slit (201), said stop element (204a, 204b) being configured so that, when the portion of the riser cable (4) engages said slit (201), the portion of the riser cable (2) lies against said stop element (204a, 204b).

7. The optical transition box (1) according to claim 5, wherein said bottom (20) comprises at least one ramp (202a, 202b) located in the proximity of said slit (201), said ramp (202a, 202b) being configured to raise the excess lengths of the first optical fiber of the riser cable (4) and of the second optical fiber of the drop cable above the portion of the riser cable (4).

8. The optical transition box (1) according to claim 7, wherein said bottom (20) comprises at least one stop element (204a, 204b) that crosses said slit (201), said stop element (204a, 204b) being configured so that, when the portion of the riser cable (4) engages said slit (201), the portion of the riser cable (2) lies against said stop element (204a, 204b).

9. The optical transition box (1) according to claim 3, wherein said base (2) comprises at least a second sidewall (21, 23) adjacent to said first sidewall (24), and wherein said first sidewall (24) forms with said second sidewall (21, 23) a channel (25a, 25b) suitable for housing the drop cable and for allowing the drop cable to exit said base (2).

10. The optical transition box (1) according to claim 9, wherein said first sidewall (24) has first teeth and said second sidewall (21, 23) has second teeth substantially facing said first teeth, said first teeth and said second teeth being suitable for retaining the drop cable in said channel (25a, 25b).

11. The optical transition box (1) according to claim 1, wherein said base (2) comprises one or more retaining tabs (28), said one or more retaining tabs (28) having a height with respect to said bottom (20) greater than a height of said first sidewall (24).

12. The optical transition box (1) according to claim 1, wherein said base (2) has a width (W) of between about 30 millimeters and 60 millimeters.

13. The optical transition box (1) according to claim 1, wherein said base (2) has a height (H) of between about 55 millimeters and 85 millimeters and a thickness (T) of between about 10 millimeters and 30 millimeters.

14. An optical transition box (1) for housing an optical connection between a riser cable (4) and at least one drop cable, said optical transition box (1) comprising a base (2) comprising:
   a bottom (20) configured to house excess lengths of a first optical fiber of a riser cable (4) and of a second optical fiber of a drop cable;
   a first sidewall (24) positioned adjacent to said bottom (20);

at least a second sidewall (21, 23) adjacent to said first sidewall (24), wherein said first sidewall (24) forms with said second sidewall (21, 23) a channel (25*a*, 25*b*) suitable for housing the drop cable and for allowing the drop cable to exit said base (2);

a slit (201) configured to engage a portion of the riser cable (4) so that the portion of the riser cable is accessible from the interior of said base (2);

at least one ramp (202*a*, 202*b*) located in the proximity of said slit (201), said ramp (202*a*, 202*b*) being configured to raise the excess lengths of the first optical fiber of the riser cable (4) and of the second optical fiber of the drop cable above the portion of the riser cable (4); and a splice-holder element (26) fixed to said first sidewall (24) and overhanging from said first sidewall (24) above said bottom (20), said splice-holder element (26) being suitable for housing at least one splice between the first optical fiber of the riser cable (4) and the second optical fiber of the drop cable, wherein a distance not less than the diameter of the first optical fiber of the riser cable (4) is provided between said bottom (20) and said splice-holder element (26);

wherein said splice-holder element (26) comprises at least one shelf (26*a*, 26*b*) projecting towards the interior of said base (2) from said first sidewall (24), said at least one shelf (26*a*, 26*b*) comprising one or more slots (261*a*, 262*a*, 261*b*, 262*b*) configured to house at least one splice.

15. The optical transition box (1) according to claim 14, wherein said bottom (20) comprises at least one stop element (204*a*, 204*b*) that crosses said slit (201), said stop element (204*a*, 204*b*) being configured so that, when the portion of the riser cable (4) engages said slit (201), the portion of the riser cable (2) lies against said stop element (204*a*, 204*b*).

16. The optical transition box (1) according to claim 15, wherein said first sidewall (24) has first teeth and said second sidewall (21, 23) has second teeth substantially facing said first teeth, said first teeth and said second teeth being suitable for retaining the drop cable in said channel (25*a*, 25*b*).

17. The optical transition box (1) according to claim 16, wherein said base (2) comprises one or more retaining tabs (28), said one or more retaining tabs (28) having a height with respect to said bottom (20) greater than a height of said first sidewall (24).

18. The optical transition box (1) according to claim 14, wherein said first sidewall (24) has first teeth and said second sidewall (21, 23) has second teeth substantially facing said first teeth, said first teeth and said second teeth being suitable for retaining the drop cable in said channel (25*a*, 25*b*).

19. The optical transition box (1) according to claim 14, wherein said base (2) comprises one or more retaining tabs (28), said one or more retaining tabs (28) having a height with respect to said bottom (20) greater than a height of said first sidewall (24).

20. An optical transition box (1) for housing an optical connection between a riser cable (4) and at least one drop cable of an optical access network, said optical transition box (1) comprising a base (2) comprising:

a bottom (20) configured to house excess lengths of a first optical fiber of a riser cable (4) and of a second optical fiber of a drop cable;

a first sidewall (24) positioned adjacent to said bottom (20);

one or more retaining tabs (28), said one or more retaining tabs (28) having a height with respect to said bottom (20) greater than a height of said first sidewall (24); and a splice-holder element (26) fixed to said first sidewall (24) and overhanging from said first sidewall (24) above said bottom (20), said splice-holder element (26) being suitable for housing at least one splice between the first optical fiber of the riser cable (4) and the second optical fiber of the drop cable, wherein a distance not less than the diameter of the first optical fiber of the riser cable (4) is provided between said bottom (20) and said splice-holder element (26).

\* \* \* \* \*

UNITED STATES PATENT AND TRADEMARK OFFICE
CERTIFICATE OF CORRECTION

PATENT NO. : 8,660,398 B2
APPLICATION NO. : 13/299955
DATED : February 25, 2014
INVENTOR(S) : Fabio Abbiati It is certified that error appears in the above-identified patent and that said Letters Patent is hereby corrected as shown below:

Title page, item (74)

Attorney, Agent or Firm should read: Additon, Higgins, Pendleton & Ashe, P.A.

In the Claims

Claim 11 Column 10, Line 47 reads: "The optical transition box (1) according to claim 1," and should read: "The optical transition box (1) according to claim 3,"

Claim 12 Column 10, Line 52 reads: "The optical transition box (1) according to claim 1," and should read: "The optical transition box (1) according to claim 3,"

Claim 13 Column 10, Line 55 reads: "The optical transition box (1) according to claim 1," and should read: "The optical transition box (1) according to claim 3,"

Signed and Sealed this
Eleventh Day of November, 2014

Michelle K. Lee
*Deputy Director of the United States Patent and Trademark Office*